United States Patent

Hawkins et al.

[11] Patent Number: 6,101,641
[45] Date of Patent: Aug. 15, 2000

[54] WASTE REMOVAL METHOD FOR DRY TOILETS

[76] Inventors: Robert D. Hawkins; James A. Hawkins, both of Trent Lock, Nottingham, United Kingdom, NG10 2FY

[21] Appl. No.: 09/269,445

[22] PCT Filed: Sep. 22, 1997

[86] PCT No.: PCT/US97/16787

§ 371 Date: Mar. 26, 1999

§ 102(e) Date: Mar. 26, 1999

[87] PCT Pub. No.: WO98/14106

PCT Pub. Date: Apr. 9, 1998

[30] Foreign Application Priority Data

Oct. 2, 1996 [GB] United Kingdom .................... 9620550

[51] Int. Cl.[7] .................................................. A47K 11/02
[52] U.S. Cl. .................. 4/484; 4/449; 4/471; 4/DIG. 19
[58] Field of Search ....................... 4/431, 449, 471–473, 4/479, 483, 484, DIG. 19

[56] References Cited

U.S. PATENT DOCUMENTS

| 3,457,567 | 7/1969 | Criss | 4/484 |
| 4,209,034 | 6/1980 | Michael | 4/431 |
| 4,346,002 | 8/1982 | Petzinger | 4/449 |
| 4,561,132 | 12/1985 | Lew et al. | 4/DIG. 19 |
| 5,193,231 | 3/1993 | Stender | 4/449 |
| 5,884,346 | 3/1999 | Hengi | 4/484 |

*Primary Examiner*—Charles R. Eloshway

[57] ABSTRACT

A system for the removal of waste from dry toilet bowls (10) and other containers adapted to have a disposable liner sheet (12) comprising an apparatus (16, 18, 20, 36) for forming elastic wads (32) from lengths of liner sheet (12) containing waste and for inserting the wads through a port (28) into a pipe (34), and an arrangement (38) for introducing air pressure into the pipe near the port to propel the wads along the pipe toward the exit (40).

1 Claim, 2 Drawing Sheets

WASTE REMOVAL METHOD FOR DRY TOILETS

TECHNICAL FIELD

This invention relates to a method of waste removal to be used with dry toilets with disposable bowl lining material.

BACKGROUND

Toilets which cannot be connected to sewer mains or sewage treatment equipment usually have storage tanks which hold the accumulated waste until such time as it is convenient to pump the waste into a tanker truck for transport to another location where sewage processing is available. This is a common procedure for mobile toilets as for example toilets installed in commercial airliners. Airliner toilets flush by using recirculated chemically treated waste water or by using a small amount of fresh water assisted by the pull of a vacuum. The waste is either stored in tanks beneath each toilet or in remote tanks which hold the waste from several toilets. These tanks can be accessed through connections in the service panels underneath the plane. When the plane is serviced the waste water is drained or pumped into a tanker truck connected at the service panels.

The weight of water used to flush toilets and the weight of the associated tanks and pipes is undesirable in an aircraft since it reduces the available payload. The weight of water used in each recirculating airline toilet is approximately 68 kg. The weight of water required to operate a vacuum toilet during a long flight is approximately 41 kg. A dry toilet which 'flushes' using a thin bowl liner film as described in International Application No. PCT/US95/03004 uses no water but instead uses 5 grams of plastic film per flush or approximately 0.6 kg during a long flight. In an airliner with ten toilets this could result in an approximate weight saving of 400 to 700 kg. There would also be additional weight savings from the elimination of equipment required to handle and store waste water.

The weight saving advantage of a dry toilet is offset by the difficulty of removing the toilet waste conveniently from positions outside the plane. The dry toilet waste combined with plastic film will not ordinarily flow through pipes to the service panel locations. In the absence of flushing water the film as well as other solid waste will cling to the walls of a pipe and will not be easily dislodged by gravity or by airflow.

DISCLOSURE OF INVENTION

The inability of dry toilet waste to flow through pipes can be overcome by the present invention which provides a means by which waste from a dry, film-lined toilet can be processed so as to be readily transmitted through pipes to remote locations without the use of water. This is accomplished by apparatus which compresses the liner material and the solid waste from each flush into a wad which expands when inserted into the pipe. This expanded wad can be pushed along the pipe by the next wad and in turn by subsequent wads that are inserted in the pipe behind it. If the expanded wad conforms well to the sides of the pipe it will form a seal allowing the wads to be pushed through the pipe by air pressure. To form an effective air seal and be transmissible through pipe by air pressure the wad must have elasticity so that it can hold its shape and maintain light contact against the walls of the pipe. This elasticity results from the mechanical properties of the thin liner material which surrounds the solid waste and which when crumpled forms the bulk of the wad. For example, a rubber material would have too much elasticity and would unravel whereas metal foil would have too little elasticity and would not expand. A material such as high density polyethylene film has been found to be sufficiently deformable to retain the wad shape and has enough residual elastic expansion to effect an air seal.

A wad containing any significant amount of free liquid waste could collapse from the pressure of the liquid and lose its ability to seal the pipe. Therefore the toilet apparatus that forms the wad must first have means to drain liquid waste from within the liner before the wad is formed. This could be done firstly with a toilet bowl having a sloped bottom portion, as shown in PCT/US95/03004, into which liquid waste can drain away from the solid waste and then secondly, if necessary, by cutting the leading end of the liner sheet to allow the liquid waste to flow out of the liner and into a separate drain.

To form the wad the soiled liner is conveyed into a piston chamber which is then enclosed to allow the piston to compress the liner containing the solid waste into a wad which when pushed further into the end of the adjoining pipe expands to fill the cross section of the pipe. Simultaneously the wad portion of the liner is cut free from that portion of the liner still in the bowl.

The mechanical piston force or alternatively the amount of differential air pressure required to move the wads through the pipe depends upon the total friction force that the accumulated wads have against the walls of the pipe. For a pipe that goes upward the effective weight of the wads would be added to the total friction force. For a pipe going downward the effective weight of the wads would subtract from the friction force.

It can be desirable to minimise the friction force to obtain the maximum storage capacity within the pipe without requiring high air pressure to move the accumulated waste material when the pipe is to be emptied. The friction force that resists the motion of the wad along the pipe is proportional to the perpendicular force that the expanded wad exerts against the wall of the pipe. This can be minimised by using a pipe with a cross section no smaller than necessary to contain the fully expanded wad. Alternatively, the elastic properties of the wad and its expanded size can be changed by altering the dimensions of the piston chamber and the exit port from the piston chamber into the pipe. As the accumulated friction in the pipe builds up then the compressed elasticity of the wads within the pipe may tend to force a portion of the last inserted wad back into the piston chamber thus reducing chamber capacity. This effect can be reduced by incorporating into the wall of the exit port or into the wall of the pipe protruding surfaces which are angled to produce high resistance to the backward motion of the wads but little resistance to the forward motion.

In an airliner the pipe can be designed to hold all the toilet waste accumulated during a long journey. At the end of the journey the waste could be quickly pushed out of the pipe by low pressure air and into a bag on the service vehicle positioned beneath the plane. To reduce servicing time a quantity of toilets could be connected to a single manifold and be emptied simultaneously. The separated liquid waste from a quantity of toilets could be stored in a single tank from which it could be drained into another tank on the service vehicle. The solid waste is largely combustible material with minimal moisture content and therefore is readily incinerated. The liquid waste has very little solid content and has no added biocides and therefore could be disposed of in any foul water drain without interfering with biologically based sewage treatment processes.

According to a preferred aspect of the present invention there is provided a waste removal system for dry toilets with disposable bowl lining material comprising, a pipe having an entrance end and an exit end, apparatus at the entrance end for the insertion into the pipe of a compressed wad of toilet bowl liner material containing toilet waste, the compressed wad having elastic properties which cause it to expand against the walls of the pipe and to push against any wads previously inserted into the pipe thus causing them to move along the pipe to the exit end, further apparatus to receive the liner material containing toilet waste and to form it into the compressed wad and means for removing liquid waste from within the lining material before insertion into the pipe.

Further according to a preferred aspect of the present invention there is provided a means for the air pressure within the pipe near the entrance end to be made greater than the air pressure within the pipe at the exit end and thereby pushing the intervening wads of toilet waste along the pipe towards the exit end and subsequently into a collection device.

According to another aspect of the present invention there is provided a toilet system for aircraft and other vehicles comprising: a dry toilet with disposable bowl lining material, means for separating the liquid waste from the solid waste, means for compressing the bowl lining material containing the solid waste into wads, means for inserting the wads sequentially into a pipe, means for ejecting the wads from the pipe into a separate collection device and means for draining the liquid waste into a separate collection device.

BRIEF DESCRIPTION OF DRAWINGS

This invention will be further described by way of example only, by reference to the accompanying and purely diagrammatic drawings, in which.

BEST MODE FOR CARRYING OUT INVENTION

Figure 1:
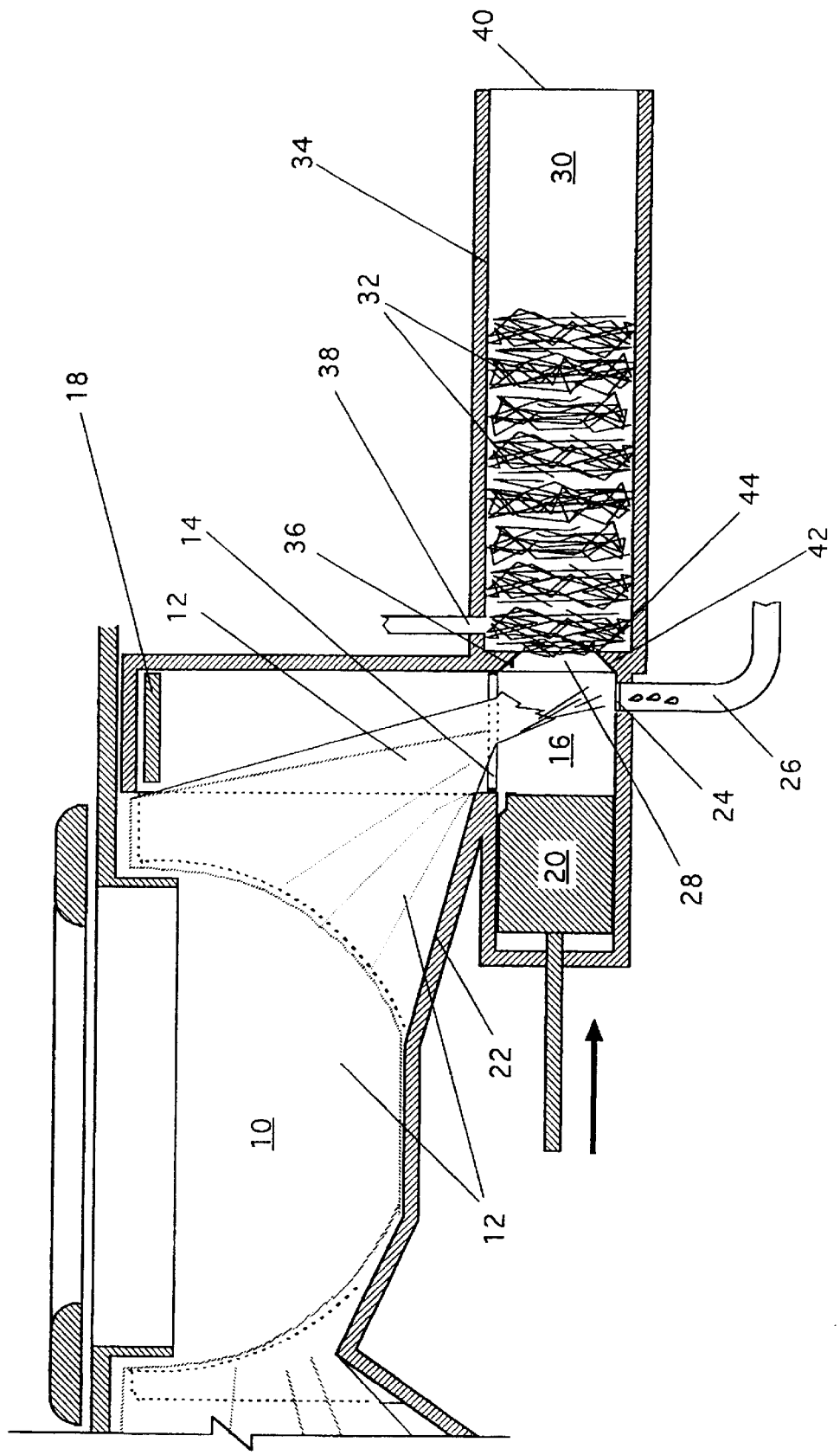
FIG. 1 is a section view of the waste transmission pipe connected to the output end of a dry toilet having apparatus to compress the waste material into transmissible wads.

A system for the transmission of waste from a dry toilet shown in FIG. 1 has a toilet bowl 10 with bowl lining sheet 12 which when the toilet is flushed is conveyed from the toilet bowl 10 over an opening 14 in the topside of a piston chamber 16 and released so as to drop into the piston chamber 16. At the start of the flushing cycle a cover plate 18 lifts upward to clear the opening 14 while at the same time the piston 20 retracts to clear the piston chamber 16 for the receipt of soiled liner sheet 12 containing solid waste. The retraction of the piston 20 releases the end of the liner sheet 12, which was pinched between the piston 20 and the topside of the piston chamber 16, thus allowing the liquid waste which has collected by gravity flow in the sloped portion 22 of the toilet bowl 10 to flow out of the open end of the liner sheet 12 and into the bottom of the piston chamber 16 and from there through the filter screen 24 and into the liquid waste drain 26.

When the soiled portion of the liner sheet 12 has been released over the opening 14 in the piston chamber 16 then the cover plate 18 is lowered onto the opening 14 thus enclosing the soiled portion of the liner sheet 12 within the piston chamber 16. The piston 20 then advances through the piston chamber 16 to compress the soiled liner sheet 12 thus creasing and deforming the liner sheet 12 so that when pushed by the piston 20 through the outlet port 28 and into the pipe 30 the compressed liner sheet 12 will form a wad 32 which is still sufficiently elastic to expand and contact the perimeter wall 34 of the pipe 30. When the piston 20 is fully advanced the liner sheet 12 is pushed by the piston 20 against a knife edge 36 which severs the liner sheet 12 and detaches it from the wad 32.

Repeating the flushing cycle will result in further wads 32 being pushed into the pipe 30 and thereby pushing the preceding wads 32 further along the pipe 30. At any time air under pressure can be introduced into the pipe 30 through an air inlet tube 38. Any wads 32 that have accumulated forward of the air inlet tube 38 will be pushed by the air pressure towards the pipe exit 40. Alternatively, movement of the wads 32 along the pipe 30 could be accomplished by lowering the pressure of the air at the pipe exit 40.

The outlet port 28 has a perimeter wall shaped to present a smooth inclined surface 42 to a wad 32 being pushed into the pipe 30 and a sharp restricting edge 44 to a wad 32 being pushed back into the piston chamber 16 by the accumulated elastic and friction forces of a quantity of wads 32 stored in the pipe 30.

Figure 2:
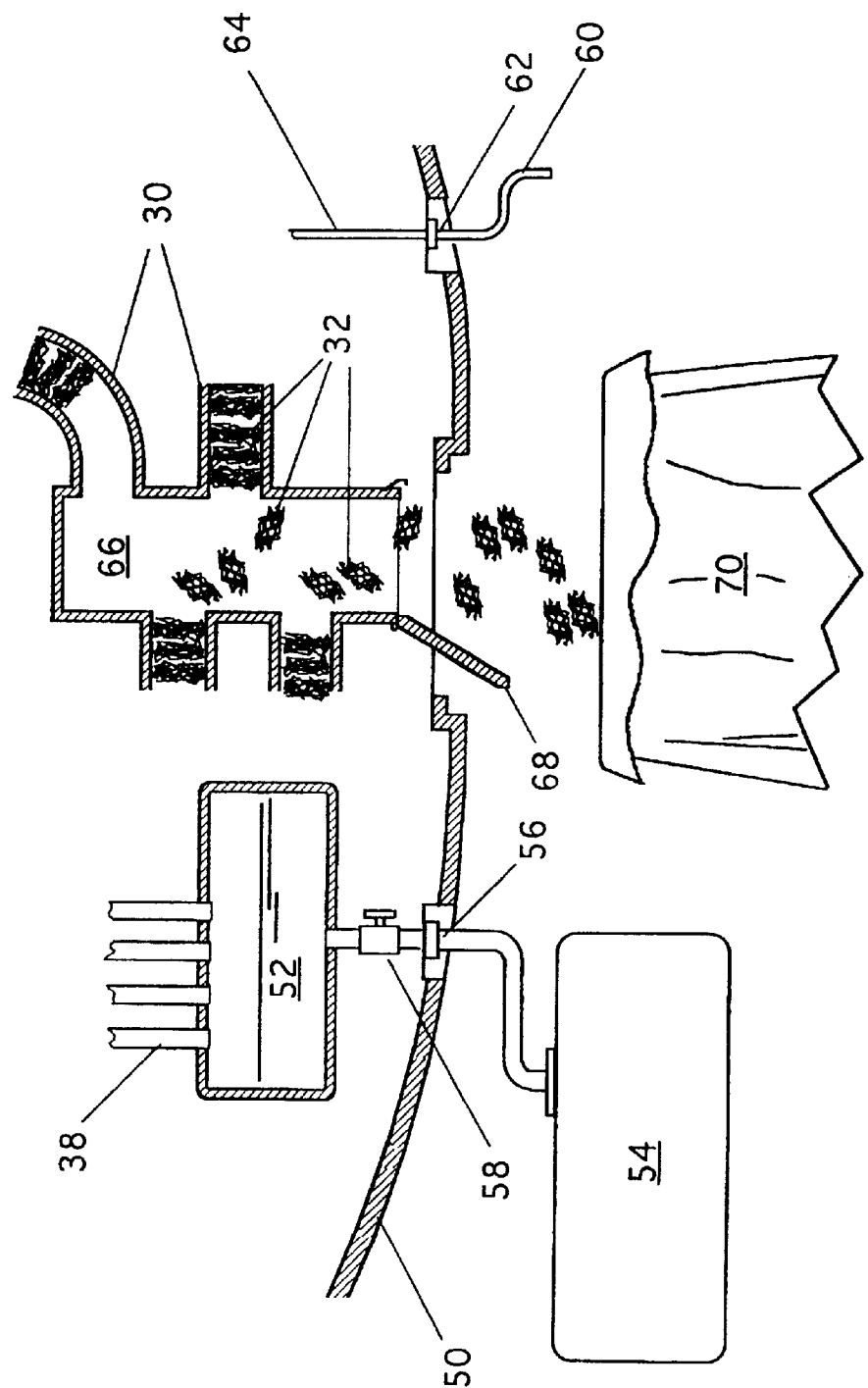
FIG. 2 is a section view of a waste removal terminal for aircraft toilets using the present invention.

FIG. 2 shows apparatus for removal of the toilet waste from a position outside the fuselage 50 of an airliner having dry toilets with disposable lining material. The liquid waste from one or more toilets is collected in a holding tank 52 which is drained into a mobile tank 54 on a service vehicle by attaching a hose 56 and opening a valve 58. The solid toilet waste enclosed in wads 32 of compressed lining sheet 12 and stored in pipes 30 is removed by connecting a source of air under pressure supplied through hose 60 to a fitting 62 on the fuselage 50. Pressurised air is then conducted through tubing 64 into the air inlet tube 38 of each toilet to be emptied. The air pressure pushes the wads 32 through the pipes 30 into a central manifold chamber 66 having a bottom cover 68 which is opened to allow the wads 32 to drop into a collection bag 70 on the service vehicle.

What is claimed is:

1. A waste removal system for dry toilets and other containers adapted to have a disposable lining sheet comprising; a lining sheet, apparatus to hold a portion of the lining sheet and thereby forming a receptacle to receive liquid waste and solid waste, the receptacle having an aperture through which the liquid waste will drain by gravity out of the receptacle while the solid waste is retained in the receptacle, further apparatus to receive the receptacle portion of the lining sheet from which the liquid waste has been drained and to fold, crease and cut the lining sheet to form a crumpled wad, an elongated pipe having an internal wall with an opening at an entrance end and another opening at an exit end, means for insertion of the wad into the opening at the entrance end of the pipe, the lining sheet having elastic mechanical properties which cause the wad to expand against the internal wall of the pipe and to push against any wads previously inserted into the pipe thus causing them to be moved forward along the pipe towards the opening at the exit end and means for the air pressure within the pipe at the entrance end to be made intermittently greater than the air pressure within the pipe at the exit end to the extent that the wads within the pipe are propelled out of the opening at the exit end and into a collection device.

* * * * *